US010399674B2

(12) United States Patent
Goodrich (10) Patent No.: US 10,399,674 B2
(45) Date of Patent: Sep. 3, 2019

(54) SYSTEMS AND METHODS COUNTERING AN UNMANNED AIR VEHICLE

(71) Applicant: Insitu, Inc., Bingen, WA (US)

(72) Inventor: Wayne Goodrich, White Salmon, WA (US)

(73) Assignee: INSITU, INC., Bingen, WA (US)

( * ) Notice: Subject to any disclaimer, the term of this patent is extended or adjusted under 35 U.S.C. 154(b) by 917 days.

(21) Appl. No.: 14/801,479

(22) Filed: Jul. 16, 2015

(65) Prior Publication Data

US 2016/0023760 A1    Jan. 28, 2016

Related U.S. Application Data

(60) Provisional application No. 62/030,024, filed on Jul. 28, 2014.

(51) Int. Cl.
*B64C 39/02* (2006.01)
*G05D 1/12* (2006.01)
(Continued)

(52) U.S. Cl.
CPC ............ *B64C 39/024* (2013.01); *B64C 11/48* (2013.01); *F41H 11/02* (2013.01);
(Continued)

(58) Field of Classification Search
CPC ......... B64C 5/06; B64C 11/48; B64C 39/024; B64C 2201/042; B64C 2201/108;
(Continued)

(56) References Cited

U.S. PATENT DOCUMENTS 965,881 A    8/1910  Draper
968,339 A    8/1910  Geraldson
(Continued)

FOREIGN PATENT DOCUMENTS

CN    1032645 A    5/1989
CN    101549754    10/2009
(Continued)

OTHER PUBLICATIONS

Ames Builds Advanced Yawed-Wing RPV, Aviation Week and Space Technology, Jan. 22, 1973, 2 pages.
(Continued)

*Primary Examiner* — Richard R. Green
*Assistant Examiner* — Brady W Frazier
(74) *Attorney, Agent, or Firm* — Hanley, Flight & Zimmerman, LLC (57) ABSTRACT

Systems and methods for countering an unmanned air vehicle are disclosed. Representative methods include directing an interceptor UAV toward a target UAV, and directing the interceptor UAV back to ground along a controlled flight path, for example, in response to an instruction not to engage with the target UAV, and/or in response to an unsuccessful engagement. Another representative method includes disabling the target UAV by deploying a disabling element (e.g., a net) from the interceptor UAV to contact the target UAV. Representative systems include a target acquisition system, a launch control system, and an engagement system carried by the interceptor UAV. In particular embodiments, the interceptor UAV can have a generally cylindrical fuselage, one or more fins carried by the fuselage, counter-rotating propellers carried by the fuselage, and a disabling system that is configured to disable the target UAV.

21 Claims, 8 Drawing Sheets

(51) Int. Cl.
  *B64C 11/48* (2006.01)
  *F41H 11/02* (2006.01)
  *B64C 5/06* (2006.01)
  *F41H 13/00* (2006.01)

(52) U.S. Cl.
  CPC ........... *F41H 13/0006* (2013.01); *G05D 1/12* (2013.01); *B64C 5/06* (2013.01); *B64C 2201/042* (2013.01); *B64C 2201/108* (2013.01); *B64C 2201/121* (2013.01); *B64C 2201/141* (2013.01); *B64C 2201/162* (2013.01)

(58) Field of Classification Search
  CPC ........ B64C 2201/121; B64C 2201/141; B64C 2201/162; F41H 11/02; F41H 13/0006; G05D 1/12
  USPC .......................................................... 244/10
  See application file for complete search history.

(56) References Cited

U.S. PATENT DOCUMENTS

| | | |
|---|---|---|
| 975,953 A | 11/1910 | Hourwich |
| 1,144,505 A | 6/1915 | Steffan |
| 1,164,967 A | 12/1915 | Thorp |
| 1,317,631 A | 9/1919 | Kinser |
| 1,383,595 A | 7/1921 | Black |
| 1,384,036 A | 7/1921 | Anderson |
| 1,428,163 A | 9/1922 | Harriss |
| 1,499,472 A | 7/1924 | Hazen |
| 1,530,010 A | 3/1925 | Neilson |
| 1,532,736 A | 4/1925 | Dodds |
| 1,556,348 A | 10/1925 | Ray et al. |
| 1,624,188 A | 4/1927 | Simon |
| RE16,613 E | 5/1927 | Moody et al. |
| 1,634,964 A | 7/1927 | Steinmetz |
| 1,680,473 A | 8/1928 | Parker |
| 1,686,298 A | 10/1928 | Uhl |
| 1,712,164 A | 5/1929 | Peppin |
| 1,716,670 A | 6/1929 | Sperry |
| 1,731,091 A | 10/1929 | Belleville |
| 1,737,483 A | 11/1929 | Verret |
| 1,738,261 A | 12/1929 | Perkins |
| 1,748,663 A | 2/1930 | Tucker |
| 1,749,769 A | 3/1930 | Johnson |
| 1,756,747 A | 4/1930 | Holland |
| 1,777,167 A | 9/1930 | Forbes |
| 1,816,976 A | 8/1931 | Kirkham |
| 1,825,578 A * | 9/1931 | Cernuda ................. B64C 39/00 244/13 |
| 1,836,010 A | 12/1931 | Audrain |
| 1,842,432 A | 1/1932 | Stanton |
| 1,869,506 A | 8/1932 | Richardson |
| 1,892,357 A | 12/1932 | Moe |
| 1,909,445 A | 5/1933 | Ahola |
| 1,912,723 A | 6/1933 | Perkins |
| 1,925,212 A | 9/1933 | Steiber |
| 1,940,030 A | 12/1933 | Steiber |
| 1,960,264 A | 5/1934 | Heinkel |
| 2,211,089 A | 8/1940 | Berlin |
| 2,286,381 A | 6/1942 | Rubissow |
| 2,296,988 A | 9/1942 | Endter et al. |
| 2,333,559 A | 11/1943 | Grady et al. |
| 2,342,773 A | 2/1944 | Wellman |
| 2,347,561 A | 4/1944 | Howard et al. |
| 2,360,220 A | 10/1944 | Goldman |
| 2,364,527 A | 12/1944 | Haygood |
| 2,365,778 A | 12/1944 | Schwab |
| 2,365,827 A | 12/1944 | Liebert |
| 2,380,702 A | 7/1945 | Persons |
| 2,390,754 A | 12/1945 | Valdene |
| 2,401,853 A * | 6/1946 | Bailey ..................... F42B 10/06 114/20.1 |
| 2,435,197 A | 2/1948 | Brodie |
| 2,436,240 A | 2/1948 | Wertz |
| 2,447,945 A | 8/1948 | Knowler |
| 2,448,209 A | 8/1948 | Boyer et al. |
| 2,465,936 A | 3/1949 | Schultz |
| 2,488,050 A | 11/1949 | Brodie |
| 2,488,051 A | 11/1949 | Brodie |
| 2,515,205 A | 7/1950 | Fieux |
| 2,526,348 A | 10/1950 | Gouge |
| 2,669,403 A | 2/1954 | Milligan |
| 2,671,938 A | 3/1954 | Roberts |
| 2,735,391 A | 2/1956 | Buschers |
| 2,787,185 A | 4/1957 | Rea et al. |
| 2,814,453 A | 11/1957 | Trimble et al. |
| 2,843,342 A | 7/1958 | Ward |
| 2,844,340 A | 7/1958 | Daniels et al. |
| 2,908,240 A | 10/1959 | Hodge |
| 2,919,871 A | 1/1960 | Sorensen |
| 2,933,183 A | 4/1960 | Koelsch |
| 2,937,827 A * | 5/1960 | Duce ....................... B64C 11/48 244/65 |
| 2,954,946 A | 10/1960 | O'Neil |
| 3,069,118 A | 12/1962 | Bernard |
| RE25,406 E | 6/1963 | Byrne et al. |
| 3,163,380 A | 12/1964 | Brodie |
| 3,268,090 A | 8/1966 | Wirkkala |
| 3,411,398 A | 11/1968 | Blakeley et al. |
| 3,454,244 A | 7/1969 | Walander |
| 3,468,500 A | 9/1969 | Carlsson |
| 3,484,061 A | 12/1969 | Niemkiewicz |
| 3,512,447 A | 5/1970 | Vaughn |
| 3,516,626 A | 6/1970 | Strance et al. |
| 3,589,651 A | 6/1971 | Niemkiewicz et al. |
| 3,657,956 A | 4/1972 | Bradley et al. |
| 3,672,214 A | 6/1972 | Yasuda |
| 3,684,219 A | 8/1972 | King |
| 3,708,200 A | 1/1973 | Richards |
| 3,765,625 A | 10/1973 | Myhr et al. |
| 3,771,484 A | 11/1973 | Schott et al. |
| 3,827,660 A | 8/1974 | Doolittle |
| 3,939,988 A | 2/1976 | Wellman et al. |
| 3,943,657 A | 3/1976 | Leckie et al. |
| 3,980,259 A | 9/1976 | Greenhalgh et al. |
| 4,037,807 A | 7/1977 | Johnston |
| 4,067,139 A | 1/1978 | Pinkerton et al. |
| 4,079,901 A | 3/1978 | Mayhew et al. |
| 4,143,840 A | 3/1979 | Bernard et al. |
| 4,149,840 A | 3/1979 | Tippmann |
| 4,147,317 A | 4/1979 | Mayhew et al. |
| D256,816 S | 9/1980 | McMahon et al. |
| 4,236,686 A | 12/1980 | Barthelme et al. |
| 4,238,093 A | 12/1980 | Siegel et al. |
| 4,267,987 A | 5/1981 | McDonnell |
| 4,279,195 A | 7/1981 | Miller |
| 4,296,894 A | 10/1981 | Schnabele et al. |
| 4,296,898 A | 10/1981 | Watson |
| 4,311,290 A | 1/1982 | Koper |
| 4,372,016 A | 2/1983 | LaViolette et al. |
| 4,408,737 A | 10/1983 | Schwaerzler et al. |
| 4,410,151 A | 10/1983 | Hoppner et al. |
| 4,457,479 A | 7/1984 | Daude et al. |
| 4,471,923 A | 9/1984 | Hoppner et al. |
| 4,523,729 A | 6/1985 | Frick et al. |
| 4,566,658 A | 1/1986 | DiGiovanniantonio et al. |
| 4,645,142 A | 2/1987 | Soelter |
| 4,653,706 A | 3/1987 | Ragiab |
| 4,678,143 A | 7/1987 | Griffin et al. |
| 4,730,793 A | 3/1988 | Thurber, Jr. et al. |
| 4,753,400 A | 6/1988 | Reuter et al. |
| 4,790,497 A | 12/1988 | Yoffe et al. |
| 4,809,933 A | 3/1989 | Buzby et al. |
| 4,842,222 A | 6/1989 | Baird et al. |
| 4,909,458 A | 3/1990 | Martin et al. |
| 4,979,701 A | 12/1990 | Colarik et al. |
| 4,991,739 A | 2/1991 | Levasseur |
| 5,007,875 A | 4/1991 | Dasa |
| 5,039,034 A | 8/1991 | Burgess et al. |
| 5,042,750 A | 8/1991 | Winter |
| 5,054,717 A | 10/1991 | Taylor et al. |
| 5,060,888 A | 10/1991 | Vezain et al. |
| 5,109,788 A | 5/1992 | Heinzmann et al. |

(56) References Cited

U.S. PATENT DOCUMENTS

| | | |
|---|---|---|
| 5,119,935 A | 6/1992 | Stump et al. |
| 5,145,129 A * | 9/1992 | Gebhard ............... B64C 29/00 244/12.1 |
| 5,176,339 A | 1/1993 | Schmidt |
| 5,222,694 A | 6/1993 | Smoot |
| 5,253,605 A | 10/1993 | Collins |
| 5,253,606 A | 10/1993 | Ortelli et al. |
| 5,259,574 A | 11/1993 | Carrot |
| 5,378,851 A | 1/1995 | Brooke et al. |
| 5,390,550 A | 2/1995 | Miller |
| 5,407,153 A | 4/1995 | Kirk et al. |
| 5,509,624 A | 4/1996 | Takahashi et al. |
| 5,583,311 A | 12/1996 | Rieger et al. |
| 5,603,592 A | 2/1997 | Sadri et al. |
| 5,655,944 A | 8/1997 | Fusselman |
| 5,687,930 A | 11/1997 | Wagner et al. |
| 5,762,456 A | 6/1998 | Aasgaard |
| 5,816,761 A | 10/1998 | Cassatt et al. |
| 5,906,336 A | 5/1999 | Eckstein |
| 5,913,479 A | 6/1999 | Westwood, III |
| 6,161,797 A | 12/2000 | Kirk et al. |
| 6,237,875 B1 | 5/2001 | Menne et al. |
| 6,264,140 B1 | 7/2001 | McGeer et al. |
| 6,343,768 B1 * | 2/2002 | Muldoon ............ B64C 29/0033 244/56 |
| 6,370,455 B1 | 4/2002 | Larson et al. |
| 6,371,410 B1 | 4/2002 | Cairo-Iocco et al. |
| 6,416,019 B1 | 7/2002 | Hilliard et al. |
| 6,442,460 B1 | 8/2002 | Larson et al. |
| 6,457,673 B1 | 10/2002 | Miller |
| 6,478,650 B1 | 11/2002 | Tsai et al. |
| 6,626,077 B1 * | 9/2003 | Gilbert ............... F41H 13/0006 102/400 |
| 6,695,255 B1 | 2/2004 | Husain |
| 6,758,440 B1 | 7/2004 | Repp et al. |
| 6,772,488 B1 | 8/2004 | Jensen et al. |
| 6,835,045 B1 | 12/2004 | Barbee et al. |
| 6,874,729 B1 | 4/2005 | McDonnell |
| 6,925,690 B2 | 8/2005 | Sievers |
| 7,059,564 B2 | 6/2006 | Dennis |
| 7,066,430 B2 | 6/2006 | Dennis et al. |
| 7,090,166 B2 | 8/2006 | Dennis et al. |
| 7,114,680 B2 | 10/2006 | Dennis |
| 7,121,507 B2 | 10/2006 | Dennis et al. |
| 7,128,294 B2 | 10/2006 | Roeseler et al. |
| 7,140,575 B2 | 11/2006 | McGeer et al. |
| 7,143,974 B2 | 12/2006 | Roeseler et al. |
| 7,152,827 B2 | 12/2006 | McGeer |
| 7,155,322 B2 | 12/2006 | Nakahara et al. |
| 7,165,745 B2 | 1/2007 | McGeer et al. |
| 7,175,135 B2 | 2/2007 | Dennis et al. |
| 7,219,856 B2 | 5/2007 | Watts et al. |
| 7,259,357 B2 | 8/2007 | Walker |
| 7,264,204 B1 | 9/2007 | Portmann |
| 7,410,125 B2 | 8/2008 | Steele |
| 7,422,178 B2 | 9/2008 | Delaune |
| 7,472,461 B2 | 1/2009 | Anstee |
| 7,510,145 B2 | 3/2009 | Snediker |
| 7,578,467 B2 | 8/2009 | Goodrich |
| 7,686,247 B1 | 3/2010 | Monson et al. |
| 7,740,210 B2 | 6/2010 | Pilon et al. |
| 7,748,661 B2 | 7/2010 | Harris et al. |
| 7,798,445 B2 | 9/2010 | Heppe et al. |
| 7,806,366 B2 | 10/2010 | Jackson |
| 8,016,073 B2 | 9/2011 | Petzel |
| 8,028,952 B2 | 10/2011 | Urnes, Sr. |
| 8,038,090 B2 | 10/2011 | Wilson |
| 8,136,766 B2 | 3/2012 | Dennis |
| 8,172,177 B2 | 5/2012 | Lovell et al. |
| 8,205,537 B1 * | 6/2012 | Dupont ............... F41H 13/0006 102/504 |
| 8,313,057 B2 | 11/2012 | Rednikov |
| 8,348,714 B2 * | 1/2013 | Newton ............... A63H 27/02 446/61 |
| 8,387,540 B2 * | 3/2013 | Merems ............... F41H 11/02 102/501 |
| 8,683,770 B2 | 4/2014 | diGirolamo et al. |
| 8,820,698 B2 | 9/2014 | Balfour et al. |
| 8,944,373 B2 | 2/2015 | Dickson et al. |
| 8,950,124 B2 | 2/2015 | Wellershoff |
| 9,085,362 B1 | 7/2015 | Kilian et al. |
| 9,266,610 B2 | 2/2016 | Knapp |
| 9,340,301 B2 | 5/2016 | Dickson et al. |
| 9,359,075 B1 | 6/2016 | von Flotow et al. |
| 9,932,110 B2 | 4/2018 | McNally |
| 2002/0011223 A1 | 1/2002 | Zauner et al. |
| 2002/0049447 A1 | 4/2002 | Li |
| 2002/0100838 A1 | 8/2002 | McGeer et al. |
| 2003/0116107 A1 | 6/2003 | Laimbock |
| 2003/0122384 A1 | 7/2003 | Swanson et al. |
| 2003/0202861 A1 | 10/2003 | Nelson |
| 2003/0222173 A1 | 12/2003 | McGeer et al. |
| 2004/0129833 A1 | 7/2004 | Perlo et al. |
| 2005/0132923 A1 * | 6/2005 | Lloyd ............... F41H 13/0006 102/477 |
| 2005/0187677 A1 | 8/2005 | Walker |
| 2006/0006281 A1 | 1/2006 | Sirkis |
| 2006/0091258 A1 | 5/2006 | Chiu et al. |
| 2006/0102783 A1 | 5/2006 | Dennis et al. |
| 2006/0249623 A1 | 11/2006 | Steele |
| 2006/0271251 A1 | 11/2006 | Hopkins |
| 2007/0023582 A1 | 2/2007 | Steele et al. |
| 2007/0051849 A1 | 3/2007 | Watts |
| 2007/0158498 A1 | 7/2007 | Snediker |
| 2007/0200027 A1 * | 8/2007 | Johnson ............... B64C 39/022 244/3.1 |
| 2007/0261542 A1 | 11/2007 | Chang et al. |
| 2008/0156932 A1 | 7/2008 | McGeer et al. |
| 2008/0191091 A1 | 8/2008 | Hoisington et al. |
| 2009/0114761 A1 * | 5/2009 | Sells, II ............... F41H 11/02 244/3.1 |
| 2009/0191019 A1 | 7/2009 | Billings |
| 2009/0194638 A1 | 8/2009 | Dennis |
| 2009/0224097 A1 | 9/2009 | Kariv |
| 2009/0236470 A1 | 9/2009 | Goossen |
| 2009/0294584 A1 | 12/2009 | Lovell et al. |
| 2010/0181424 A1 * | 7/2010 | Goossen ............... F41H 13/0006 244/110 F |
| 2010/0237183 A1 * | 9/2010 | Wilson ............... B64C 39/024 244/3 |
| 2010/0243799 A1 * | 9/2010 | Al-Qaffas ............... F41F 1/06 244/110 C |
| 2010/0318475 A1 | 12/2010 | Abrahamson |
| 2012/0210853 A1 * | 8/2012 | Abershitz ............... B64F 1/04 89/1.11 |
| 2012/0223182 A1 | 9/2012 | Gilchrist, III et al. |
| 2013/0082137 A1 | 4/2013 | Gundlach et al. |
| 2015/0129716 A1 | 5/2015 | Yoffe |
| 2015/0166177 A1 | 6/2015 | Bernhardt |
| 2016/0114906 A1 | 4/2016 | McGeer et al. |
| 2016/0137311 A1 | 5/2016 | Peverill et al. |
| 2016/0144980 A1 | 5/2016 | Kunz et al. |
| 2016/0152339 A1 | 6/2016 | von Flowtow |
| 2016/0264259 A1 | 9/2016 | Dickson et al. |
| 2016/0327945 A1 | 11/2016 | Davidson |
| 2016/0375981 A1 | 12/2016 | McDonnell |
| 2017/0225784 A1 | 8/2017 | Kunz et al. |
| 2017/0369185 A1 | 12/2017 | Grub |
| 2018/0162528 A1 | 6/2018 | McGrew et al. |

FOREIGN PATENT DOCUMENTS

| | | |
|---|---|---|
| CN | 102384702 | 3/2012 |
| DE | 4301671 A1 | 7/1993 |
| DE | 19602703 A1 | 2/1997 |
| DE | 102010010508 | 9/2011 |
| EP | 0742366 A1 | 11/1996 |
| FR | 854371 | 4/1940 |
| GB | 1445153 | 8/1976 |
| GB | 2 080 216 A | 2/1982 |
| GB | 2093414 A | 9/1982 |
| GB | 2 150 895 A | 7/1985 |

(56) References Cited

FOREIGN PATENT DOCUMENTS

| GB | 2 219 777 A | 12/1989 |
|---|---|---|
| GB | 2231011 A | 11/1990 |
| IL | 76726 | 1/1991 |
| JP | 07-304498 | 11/1995 |
| JP | 2008540217 A | 11/2008 |
| WO | WO-00/75014 A1 | 12/2000 |
| WO | WO-01/07318 A1 | 2/2001 |
| WO | WO-2008015663 A1 | 2/2008 |
| WO | WO-2011066400 | 6/2011 |
| WO | WO-2012047677 | 4/2012 |
| WO | WO-2014080386 | 5/2014 |

OTHER PUBLICATIONS

Article: Robinson: R. Robinson, "Dynamic Analysis of a Carousel Remotely Piloted Vehicle Recovery System," 1977, Naval Post-Graduate School Master's Thesis, No. ADA052401, 70 pages.

Article: Stephen A. Whitmore, Mike Fife, and ; Logan Brashear: "Development of a Closed-Loop Strap Down Attitude System for an Ultrahigh Altitude Flight Experiment," Jan. 1997, NASA Technical Memorandum 4775, 31 pages.

Dorr, Robert F., "The XF-85 Goblin," http://www.defensemedianetwork.com/stories/the-xf-85-goblin-the-parasite-fighter-that-didnt-work/, DefenseMediaNetwork, Sep. 11, 2014, 5 pages.

Gross, Jon L., Investigation of Lift, Drag, and Aerodynamic Pitching Moment During In-Flight Recovery of a Remotely Piloted Vehicle, Air Force Institute of Technology, NTIS, Sep. 1973, 99 pages.

Hunton, Lynn W. and James, Harry A., NACA Research Memorandum for the Air Material Command, U.S. Air Force, "An Investigation of the McDonnell XP-85 Airplane in the Ames 40 by 80 Foot Wind Tunnel—Force and Moment Tests," National Advisory Committee for Aeronautics, Sep. 27, 1948, 155 pages.

Phillips, K.; "Alternate Aquila Recovery System Demonstration Recovery System Flight Test," Final Report; Jan. 19, 1977, 67 pages.

Plane Talk, The Newsletter of the War Eagles Air Museum, www.war-eagles-air-museum.com vol. 25, No. 1, First Quarter (Jan.-Mar.) 2012, 8 pages.

Study: US Army: H. E. Dickard, "Mini-RPV Recovery System Conceptual Study," Aug. 1977, Contract DA4J02-76-C-0048, Report No. USAAMRDL-TR077-24, 321 pages.

Galinski et al., "Results of the Gust Resistant MAV Programme," 28th International Congress of the Aeronautical Sciences, 2012, 10 pages.

European Search Report for European Patent Application No. 15178375, Applicant: Insitu, Inc., Jan. 7, 2016, 8 pages.

U.S. Appl. No. 15/638,137, filed Jun. 29, 2017, Leon.

U.S. Appl. No. 15/892,701, filed Feb. 9, 2018, Kunz et al.

European Examination Report for European Patent Application No. 15178375.0, Applicant: Insitu, Inc., dated Jun. 19, 2018, 5 pages.

China National Intellectual Property Administration, "Notification of Second Office Action," issued in connection with Chinese Patent Application No. 201410446066.8, dated May 13, 2019, 8 pages.

State of Israel Patent Office, "Notification of Defects in Patent Application," issued in connection with Israel Patent Application No. 240141 dated May 23, 2019, 8 pages.

\* cited by examiner

| Specifications ||
|---|---|
| GTOW = | 15 lbs |
| Payload = | 2.5 lbs |
| Fuel = | 5.2 lbs / 6+=Whr LiPo |
| Mission Radius = | 6 nmi |
| Max Time-of-Flight = | 10 min |
| Fly-out Speed = | 100-150 ktas |
| Loiter Speed = | 60 keas |
| Dash Speed = | 150 ktas |
| Ceiling = | 5,000 ft |
| Engine = | 2 x Neu 1915 DC motor |
| Wingspan = | 1.5 ft |
| Recovery Footprint = | 10 x 10 ft |

SYSTEMS AND METHODS COUNTERING AN UNMANNED AIR VEHICLE

CROSS-REFERENCE TO RELATED APPLICATION

The present application claims priority to U.S. Provisional Application No. 62/030,024 filed on Jul. 28, 2014 and incorporated herein by reference.

TECHNICAL FIELD

The present disclosure is directed generally to systems and methods for countering an unmanned air vehicle (UAV). In particular embodiments, representative systems and methods include directing an interceptor UAV toward a target UAV to disable the target UAV.

BACKGROUND

Unmanned air vehicles (UAVs) have been used in a wide variety of capacities to provide surveillance and perform other tasks. Some tasks include destroying, disabling or otherwise damaging a target on the ground. Accordingly, a need has arisen for systems to counter such UAVs so as to avoid damage to military and/or civilian installations. The present disclosure is directed to such systems.

DETAILED DESCRIPTION

The present disclosure is directed generally to counter-UAV systems and associated methods. A representative counter-UAV system in accordance with a particular embodiment includes an interceptor UAV that is launched toward a detected target UAV. The target UAV is detected, for example, by a ground-based detector, which triggers a launch sequence for the interceptor UAV. The interceptor UAV then flies autonomously to intercept the target UAV. For at least one phase of operation, the interceptor UAV may receive signals from the ground to assist in directing it toward the target. During another phase of operation, the interceptor UAV can operate without such assistance, e.g., as it engages with the target UAV. The interceptor UAV can disable the target UAV, for example, by deploying a net that interferes with the flight of the target UAV and causes the target UAV to strike the ground. In particular embodiments, the interceptor UAV can also return to the ground, but in a controlled manner (so as to be used again), e.g., if it does not successfully engage with and/or disable the target UAV. Further embodiments and specific details of representative systems and methods in accordance with the present technology are described below with reference to FIGS. 1-7.

Many embodiments of the present disclosure described below may take the form of computer- or controller-executable instructions, including routines executed by a programmable computer, controller and/or associated system. Those skilled in the relevant art will appreciate that the disclosure can be practiced on computer systems other than those shown and described below. The technology can be embodied in a special purpose computer or data processor that is specifically programmed, configured or constructed to perform one or more of the computer-executable instructions described below. Accordingly, the terms "computer" and "controller" as generally used herein refer to any suitable data processor and can include Internet appliances and handheld devices, including palmtop computers, wearable computers, cellular or mobile phones, multi-processor systems, processor-based or programmable consumer electronics, network computers, mini-computers and the like. Information handled by these computers and/or controllers can be presented to a user, observer, or other participant via any suitable display medium, such as an LCD screen.

In particular embodiments, aspects of the present technology can be practiced in distributed environments, where tasks or modules are performed by remote processing devices that are linked through a communications network. In distributed computing environments, program modules or subroutines may be located in local and remote memory storage devices. Aspects of the technology described below may be stored or distributed on computer-readable media, including magnetically or optically readable or removable computer disks, as well as distributed electronically over networks. Data structures and transmissions of data particular to aspects of the present technology are also encompassed within the scope of particular embodiments of the present technology.

Figure 1:
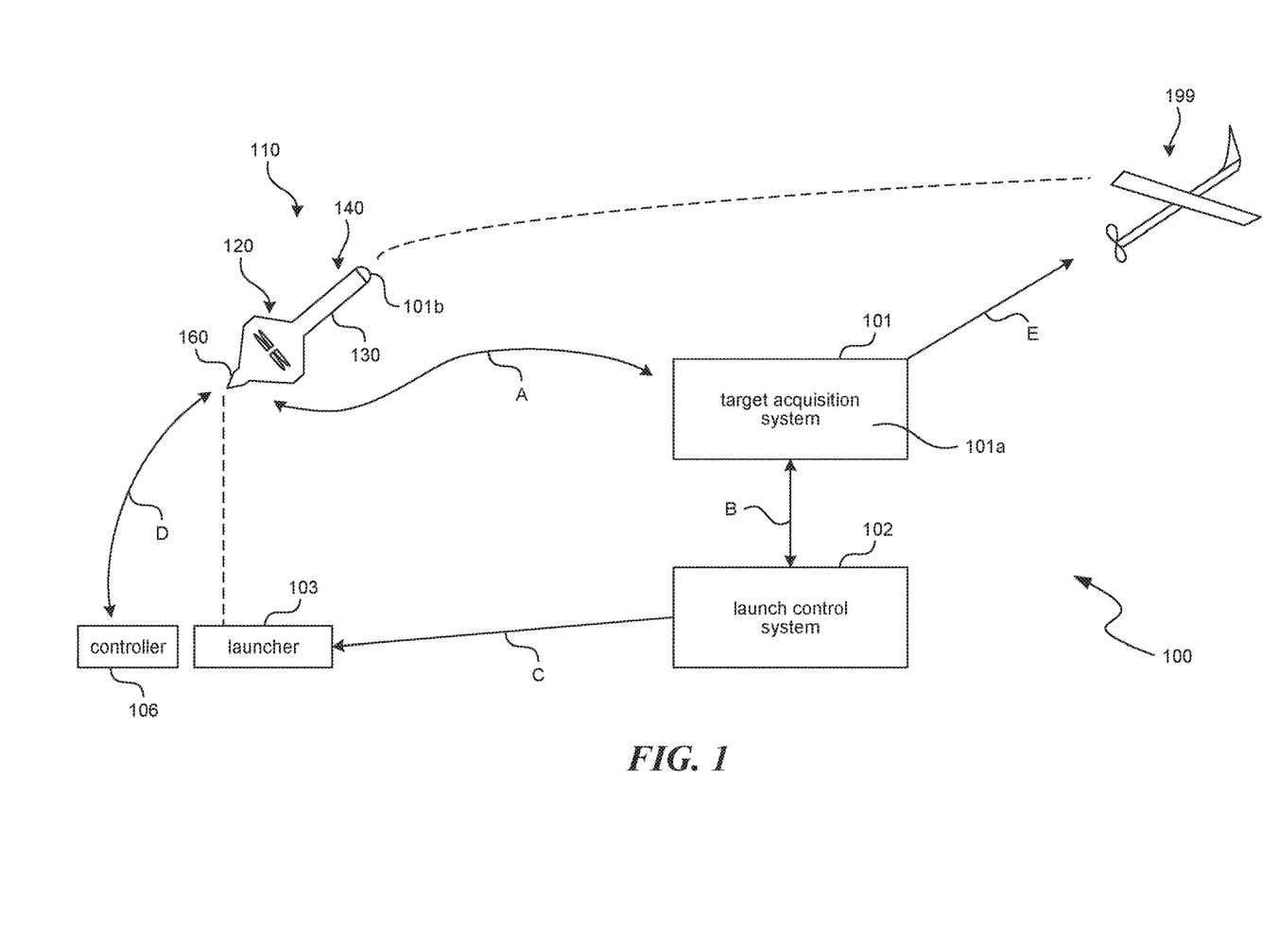
FIG. 1 is an overall schematic illustration of a counter-UAV system and associated methods.

FIG. 1 illustrates an overall system 100 that includes an interceptor UAV 110 configured to disable or destroy a target UAV 199. The interceptor UAV 110 can include a propulsion system 120, a guidance system 130 (e.g., computer-based or controlled), a communication system 160 (e.g., computer-based or controlled), and an engagement system 140 (e.g., computer-based or controlled). The engagement system 140 is used to engage with and disable the target UAV 199. The overall system 100 can further include a target acquisition system 101 (e.g., computer-based or controlled), which operates in (and/or can otherwise monitor) the airspace in which the target UAV 199 may appear to acquire the target UAV 199, as indicated by arrow E. The target acquisition system 101 further includes one or more first components 101a that are not carried by the interceptor UAV 110, and one or more second components 101b that are carried by the interceptor UAV 110. These components can communicate with each other, as indicated by arrow A. A launch control system 102 communicates with the target acquisition system 101 (as indicated by arrow B) and, based on the information it receives, transmits a signal to a launcher 103 (e.g., computer-based or controlled) (as indicated by arrow C). The launcher 103 launches the interceptor UAV 110, which then flies toward the target UAV 199 and then intercepts and engages with the target UAV 199. The interceptor UAV 110 communicates with a ground station or other controller 106 that provides command and control signals and/or receives data, as indicated by arrow D.

Further details of representative embodiments of the interceptor UAV 110 are described below with reference to FIGS. 2-3C. Further details of a representative sequence of events for intercepting a target UAV are then described below with reference to FIG. 4, and FIGS. 5-7 provide additional details of selected features of the system 100.

Figure 2:
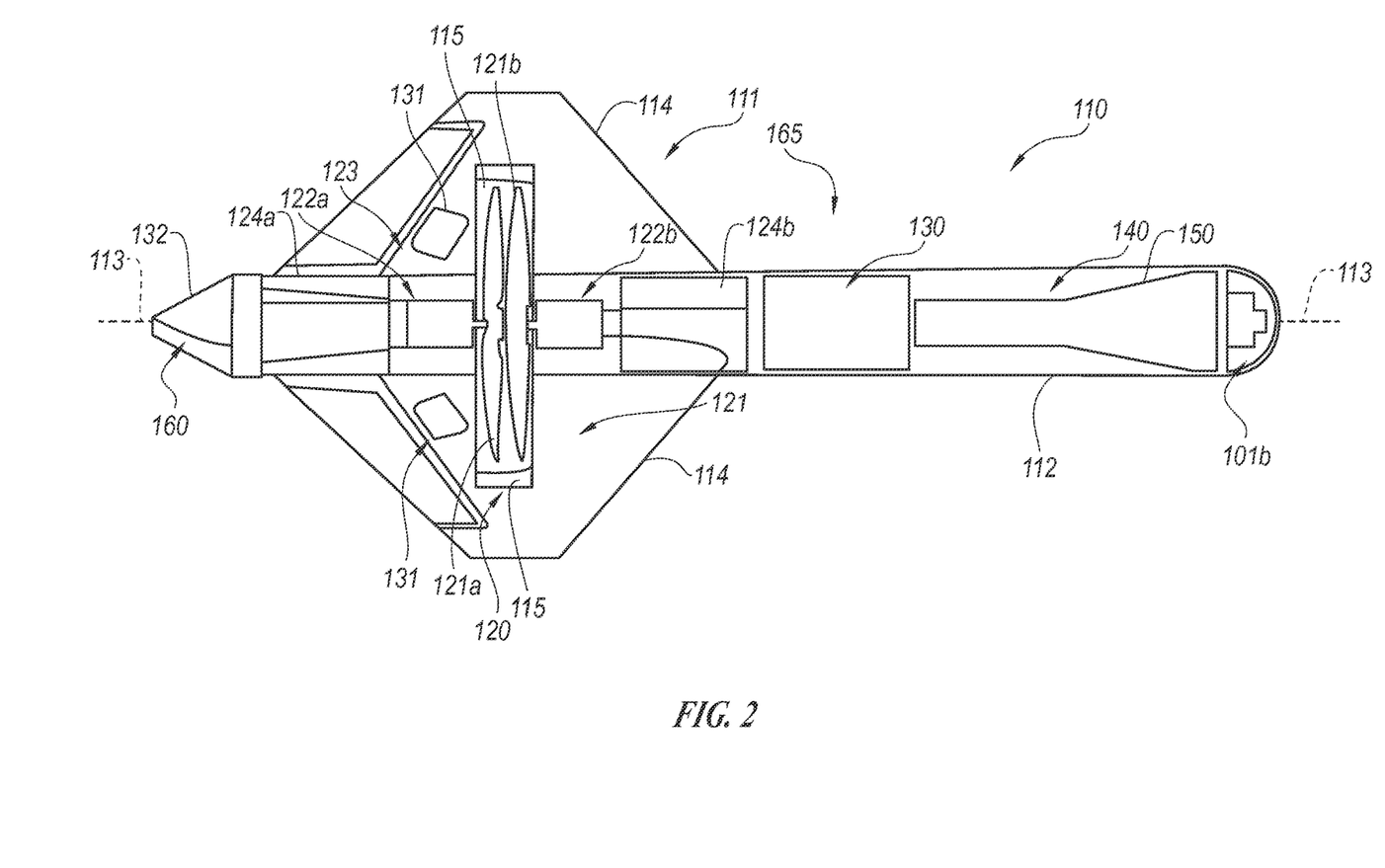
FIG. 2 is a side view of a representative interceptor UAV configured in accordance with an embodiment of the present disclosure.

FIG. 2 is a partially schematic, partially transparent plan view of a representative interceptor UAV 110 described above with reference to FIG. 1. In a particular aspect of this embodiment, the interceptor UAV 110 includes a flight vehicle 111 which in turn includes a fuselage 112 elongated along a fuselage axis 113. The interceptor UAV 110 includes a propulsion system 120 that can in turn include one or more propellers 121 that provide thrust for the interceptor UAV 110. In a particular embodiment, the propulsion system 120 includes a first propeller 121a and a second propeller 121b. The propellers 121a, 121b can operate in a counter-rotating manner so as to reduce or eliminate twist or torque, which might otherwise be imparted to the interceptor UAV 110 as the propulsion system 120 generates thrust.

In a particular aspect of an embodiment shown in FIG. 2, the propellers 121 can be integrated with the fuselage 112 at some distance along the length of the fuselage 112, rather than at the forward or aft tip of the fuselage 112. For example, as shown in FIG. 2, the first and second propellers 121a, 121b can be positioned along the fuselage axis 113, e.g., about one-third of the distance between the aft end and the forward end of the fuselage 112. In a particular embodiment, the propellers 121a, 121b can also be integrated with one or more other elements of the interceptor UAV 110. For example, the interceptor UAV 110 can include one or more fins 114 (e.g., four) that provide stability for the interceptor UAV 110. Each fin 114 can include a slot 115 that receives the first and second propellers 121a, 121b as the propellers rotate. Accordingly, as the propellers 121a, 121b rotate, they pass sequentially from the slot 115 in one fin 114 to and through the slot 115 in the adjacent fin 114 so as to avoid interfering with the fins 114, while at the same time generating thrust for the interceptor UAV 110.

The propulsion system 120 can further include a power source 123 that provides power to the propellers 121a, 121b. In a particular embodiment, the power source 123 includes an electrical energy storage device, for example, one or more batteries 124. In still a further particular embodiment, the power source 123 includes two batteries: a first battery 124a and a second battery 124b. Each battery 124a, 124b directs electrical current to a corresponding motor 122 (shown as a first motor 122a and a second motor 122b), which rotate the first and second propellers 121a, 121b, respectively. The separate propellers, motors and batteries can provide a measure of redundancy for the interceptor UAV 110. In other embodiments, the propulsion system 120 can include other arrangements, for example, propellers driven by a single motor and/or a single battery, propellers powered by an internal combustion engine, and/or a rocket or other non-propeller system.

The interceptor UAV 110 can also include a vehicle management system (VMS) 165 that oversees, conducts, directs, and/or executes processes, at least some of which are carried out by a variety of systems, subsystems and/or other elements. Representative systems include a guidance system 130 that operates to control and guide the interceptor UAV 110 toward its target. For example, the guidance system 130 can be coupled to one or more control surfaces 131 to steer and maneuver the interceptor UAV 110. The control surfaces 131 can be carried by the fins 114 (as shown in FIG. 2), and/or by the fuselage 112, and/or by other elements/structures of the interceptor UAV 110. In a particular embodiment, the control surfaces 131 are positioned in the prop wash from the propellers 121a, 121b to improve control authority at low airspeeds, e.g., during vertical take-off. The guidance system 130 can also include a navigation system 132 (e.g., an on-board GPS system) that provides information regarding the location of the interceptor UAV 110. The VMS 165 coordinates the operation of the navigation system 132 and the control surfaces 131 to provide for proper guidance of the interceptor UAV 110. The communication system 160 provides for communication with a ground station or other controller, and/or other elements of the overall system 100.

The interceptor UAV 110 can also include an engagement system 140 that is used to engage with the target UAV 199 described above with reference to FIG. 1. In particular, the engagement system 140 can include the airborne component(s) 101b of the target acquisition system described above with reference to FIG. 1. In addition, the engagement system 140 can include a disabling system 150 that disables the target UAV 199 when the interceptor UAV 110 is within a suitable range of the target UAV 199. In a particular embodiment, the disabling system 150 can include a disabling element, e.g., a net that is deployed to entangle the target UAV 199, as will be described further below with reference to FIGS. 4 and 6. The engagement system 140 can include, control, and/or communicate with other aircraft systems (e.g., the guidance system 130) that contribute to providing instructions for guiding the interceptor UAV 110 and/or directing the interceptor UAV 110.

Figure 3A:
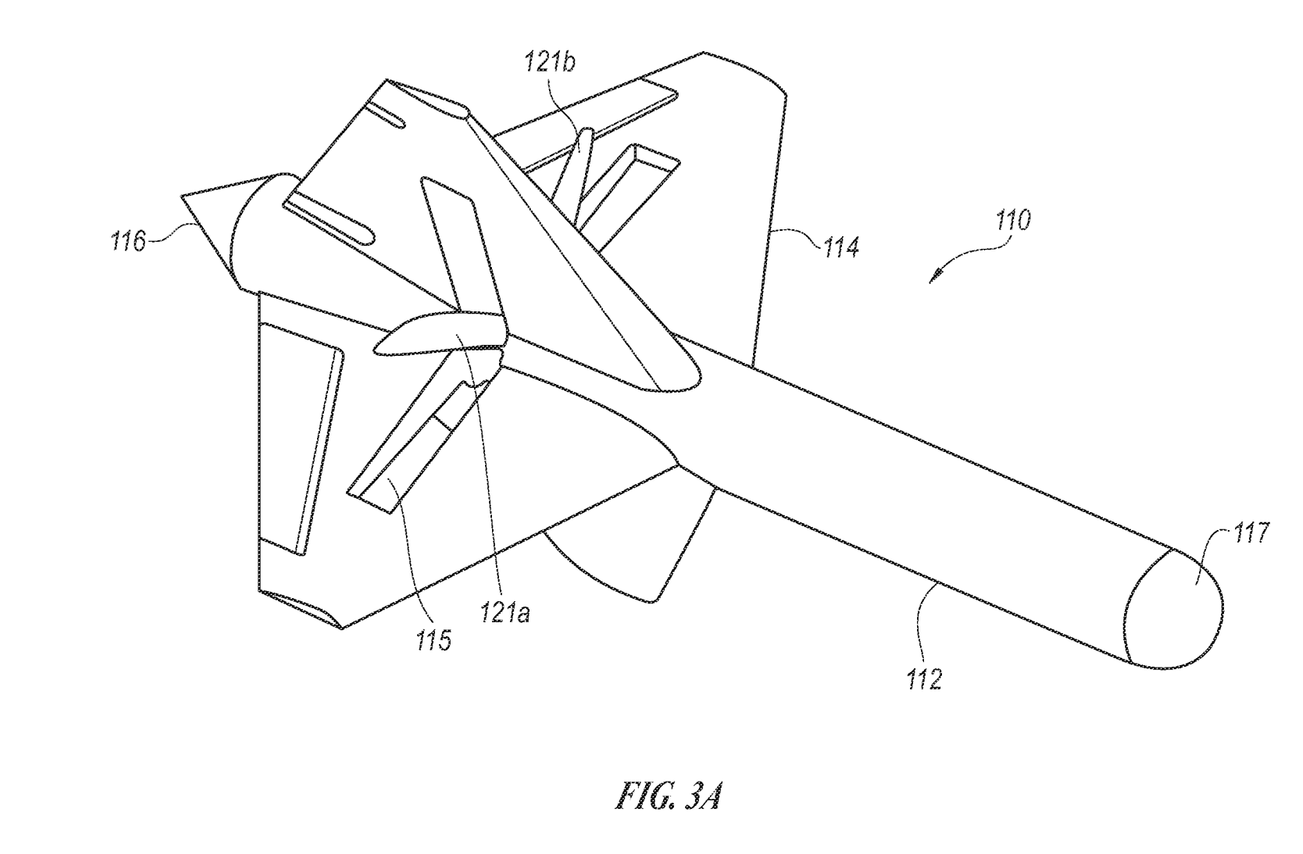
FIGS. 3A-3C are front isometric, top plan, and front views, respectively, of a representative interceptor UAV shown in FIG. 2.
Figure 3B:
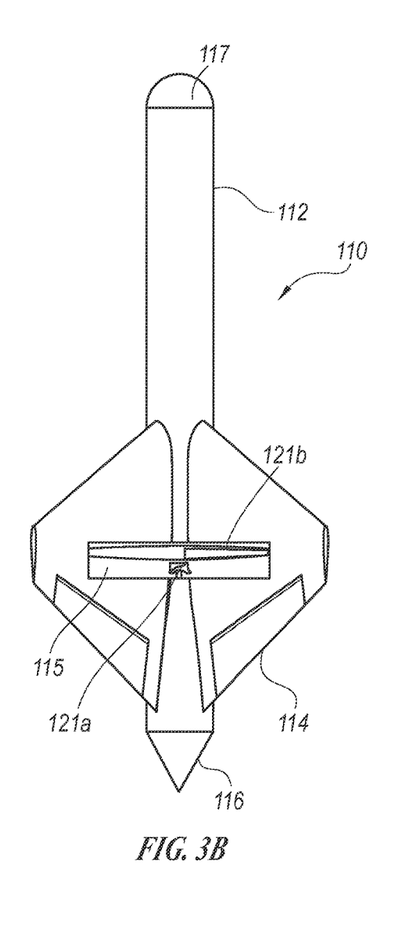
Figure 3C:
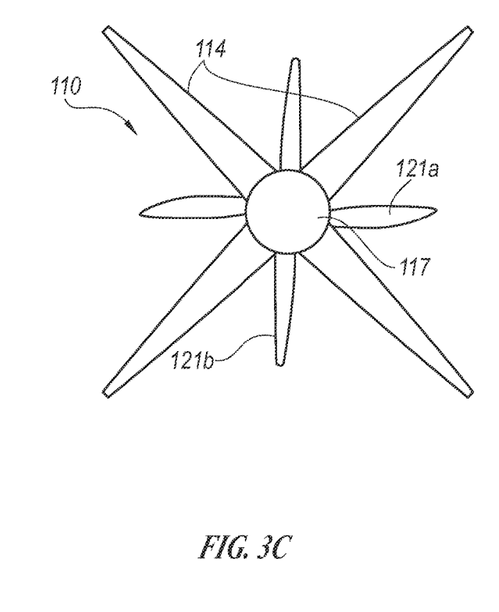

FIGS. 3A-3C illustrate further views of a representative embodiment of the interceptor UAV 110. For example, these Figures illustrate a nose 117 of the flight vehicle 111 that can house the airborne components 101b of the target acquisition system (see FIG. 2). FIGS. 3A-3B also illustrate a tail cone 116 that can house the communication system 160, described above with reference to FIG. 2.

Figure 4:
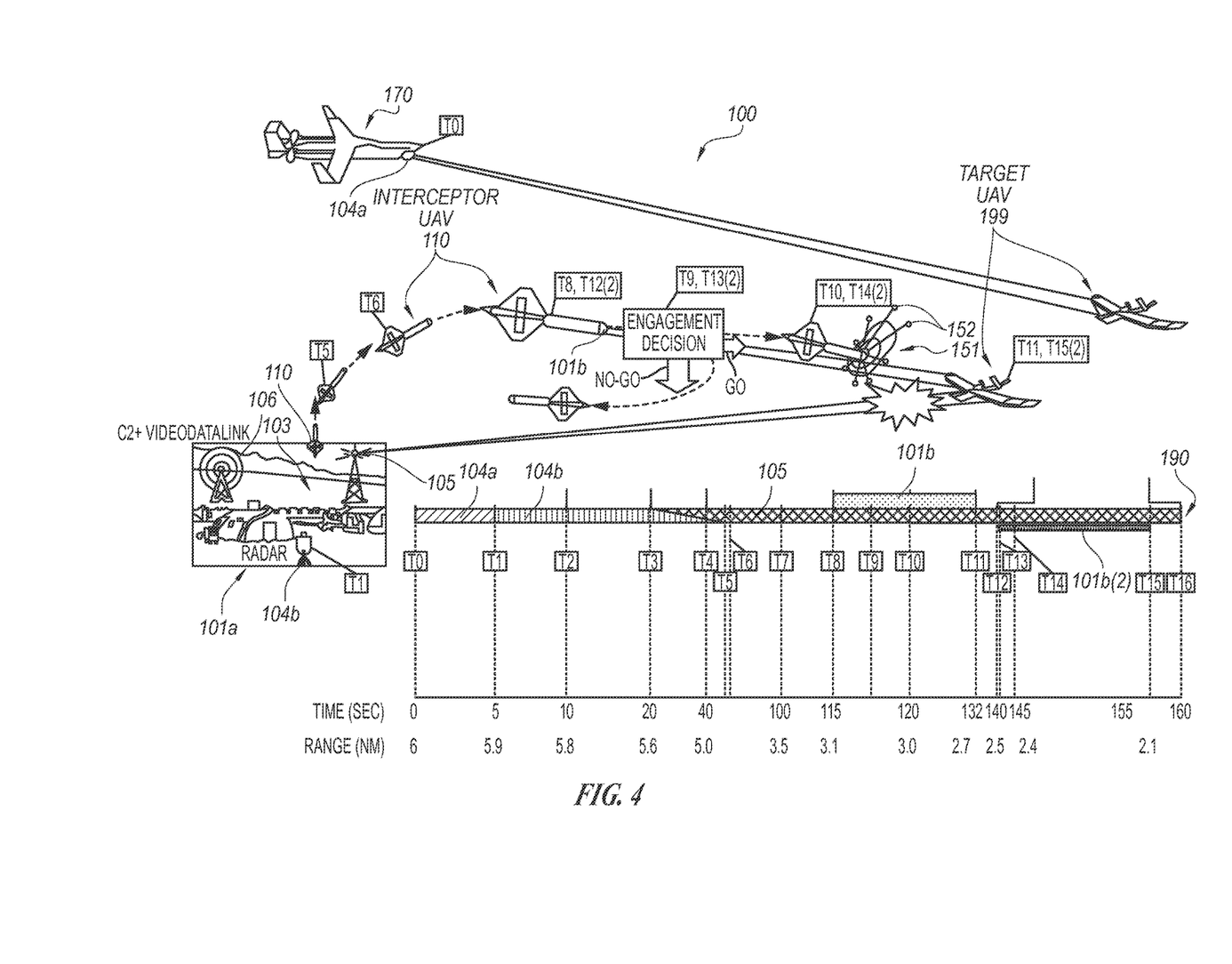
FIG. 4 is a partially schematic timeline and illustration of a representative trajectory for a target UAV and associated interceptor UAVs, in accordance with a particular embodiment of the present technology.

FIG. 4 illustrates a timeline 190 having representative points in time (e.g., T0, T1, T2, etc.) that correspond to representative tasks performed by the system 100, as the interceptor UAV 110 engages the target UAV 199. Below the timeline, FIG. 4 illustrates expected, representative elapsed times in accordance with a particular embodiment, along with representative down-range locations for the incoming target UAV 199. The times and ranges assume the target UAV 199 has a speed of about 90 knots. The characteristics of the interceptor UAV 110 are generally as described above with reference to FIGS. 2-3C, and as described in further detail later with reference to FIG. 5.

FIG. 4 also schematically identifies representative locations of the interceptor UAV 110 and the target UAV 199, with corresponding points in time (boxed) at which these vehicles arrive at the illustrated locations. In a particular embodiment shown in FIG. 4, the overall system 100 deploys up to two interceptor UAVs 110 to disable the incoming target UAV 199. Accordingly, points in time associated with the second interceptor UAV are indicated with a parenthetical "2," e.g., "T7(2)." In other embodiments, the system can be configured to deploy a single interceptor UAV 110 and in still further embodiments, more than two interceptor UAVs 110.

The representative process shown in FIG. 4 begins at time T0 when the target UAV 199 is first detected by the system 100. In a particular embodiment, the target UAV 199 can be detected by a first detector, e.g., a first radar 104a. In a further aspect of this embodiment, the first radar 104a can be carried by an airborne platform 170. For example, the airborne platform 170 can include an RQ-21A aircraft manufactured by Insitu Inc., a subsidiary of The Boeing Company. In other embodiments, the airborne platform 170 can include other aircraft, and in still further embodiments, the first radar 104a can be carried by platforms other than airborne platforms.

At time T1, a second detector, e.g., a second radar 104b, assumes responsibility for tracking the target UAV 199. In a particular embodiment, the second radar 104b can include a ground-based radar and in other embodiments, the second radar 104b can have other locations. In any of these embodiments, information received from the second radar 104b is used to perform tracking tasks. For example, at time T2, the azimuth, elevation, and range of the target UAV 199 are calculated using information from the second radar 104b, and the track of the target UAV 199 is established. At time T3, the system 100 calculates an intercept track for the interceptor UAV 110. This information is then used to direct a launcher 103 to launch a first interceptor UAV 110 at time T4. In a particular embodiment, the launch is vertical, e.g., from a canister or other suitable launch device. In addition, at time T3, an additional tracking system, e.g., a ground-based optics system 105, begins identifying and tracking the target UAV 199. The ground-based optics system 105 remains actively engaged with the target UAV 199 throughout the rest of the process.

At time T5, the interceptor UAV 110 continues its upward and down-range trajectory. At time T6, the interceptor UAV 110 transitions to an intercept vector. In a particular embodiment, the interceptor UAV 110 achieves a speed of 100 KTAS, and transitions to a target acquisition mode.

At time T7, a second interceptor UAV 110 is launched (e.g., for systems 100 that include the capability for deploying multiple interceptor UAVs 110 toward a single target), typically before the first UAV 110 has disabled (or attempted to disable) the target UAV 199. The instructions given to the second interceptor UAV 110 and the actions taken by the second interceptor UAV 110 parallel those discussed above and further below with reference to the initial interceptor UAV 110. In FIG. 4, selected times associated with the second interceptor UAV 110 are indicated with a parenthetical "2." Accordingly, "T7(2)" indicates the launch of the second interceptor UAV 110.

At time T8, the initial interceptor UAV 110 acquires the target UAV 199 using the second target acquisition system 101b carried by the interceptor UAV 110. For example, the second target acquisition system 101b can include an airborne optics system. The second target acquisition system 101b can remain active for the rest of the mission of the initial interceptor UAV 110.

Once the second target acquisition system 101b has acquired the target, the process can include comparing the image(s) obtained from the second target acquisition system 101b with the image(s) obtained from the ground-based optics system 105 and/or other elements of the first target acquisition system 101a. This process can be performed to confirm that the target acquired by the interceptor UAV 110 matches the target identified by the ground-based or other target acquisition systems. The comparison process can be carried out by a human operator in particular embodiments, and can be automated in other embodiments.

At time T9, an engagement decision is made. In some embodiments, human operators or other suitable personnel make the decision, and in other embodiments, the decision can be automated. In any of these embodiments, the decision can be made based on the comparison process described above, and/or other information received from the second target acquisition system 101b (carried by the first interceptor UAV 110) and/or other information received from the first target acquisition system 101a and/or other assets or subsystems. Once the decision is made, the first interceptor UAV 110 receives instructions to either continue with the intercept track, or abort the intercept track and return to ground. If the decision is made to abort the intercept track, the first interceptor UAV 110 returns to its base (or another suitable landing site) and lands, for example, with a controlled descent into an airbag, or via another suitable procedure.

If the decision is made to continue with the intercept track, then at time T10, the first interceptor UAV 110 executes a terminal maneuver. In a particular embodiment, the interceptor UAV achieves a velocity of 150 KTAS for this portion of the mission. In cases for which the interceptor UAV 110 includes an outward-deploying net, the track toward the target UAV 199 can be head-on to increase the likelihood for a successful engagement. The terminal maneuver can include deploying the disabling system 150 (e.g., deploying a net 151 and associated weights 152) that make contact with, tangle with, and/or otherwise disable the target UAV 199. In one aspect of this embodiment, the net 151 deploys generally outwardly to entangle the oncoming target UAV 199. In a further aspect of this embodiment, the net's outward deployment direction (rather than a forward deployment direction) reduces the likelihood that the net 151 will interfere with the nose-mounted second target acquisition system 101b. In other embodiments, the second target acquisition system 101b can be expended during the disabling process. In such cases, the interceptor UAV 110 can use other systems to perform a controlled landing, or can itself be expended.

During the disabling process, the net 151 can tangle with or otherwise become caught in the propeller(s), fuselage, lifting surfaces and/or other elements of the target UAV 199, so as to interfere with and disable the controlled flight of the target UAV 199. The net 151 can remain attached to the interceptor UAV 110 after it is deployed, so that both the first interceptor UAV 110 and the entangled target UAV 199 fall to the ground. In other embodiments, the net 151 can be released by the first interceptor UAV 110, in which case, the target UAV 199 can fall to the ground, and the first interceptor UAV 110 can return to ground in accordance with a controlled process (e.g., a normal landing), similar to or identical to the process described above in which the interceptor UAV 110 lands if a decision is made to abort the intercept mission.

If the first interceptor UAV 110 is successful, then at time T11, the intercept process is complete, and at time T12, the system 100 confirms the success of the intercept, e.g., from the ground-based optics system 105 and/or another sensor. The second interceptor UAV 110 then lands in a controlled manner.

If the terminal maneuver and intercept processes carried out by the first interceptor UAV 110 are not successful (e.g., if the first interceptor UAV 110 did not or did not sufficiently disable the target UAV 199), and if the first interceptor UAV 110 is still flyable, then the first interceptor UAV 110 returns to its base. For example, if the interceptor UAV releases the net 151 as part of the disabling process, and does not strike the target UAV 199 as part of the engagement maneuver, then the interceptor UAV 110 can redirect its flight path to land. If the net 151 remains attached to the interceptor UAV 110 during a normal disabling process, and the disabling process is not successful, the interceptor UAV 110 can jettison the net 151 before landing. In one aspect of such an embodiment, the net 151 can be deployed from the tail of the interceptor UAV 110 rather than the nose, to avoid interfering with the propellers of the interceptor UAV 110.

If the first interceptor UAV 110 is unsuccessful, then the second interceptor UAV 110 continues to carry out the mission. For example, at time T12, the second interceptor UAV 110 can acquire the target UAV 199. At time T13, the second interceptor UAV 110 can be directed to either complete the engagement process or return to base, and at time T14, the second interceptor UAV 110 can execute the terminal engagement process. At time T15, the second interceptor UAV 110 intercepts the target UAV 199, and at time T16, the system 100 confirms a successful intercept by the second interceptor UAV 110.

Figure 5:
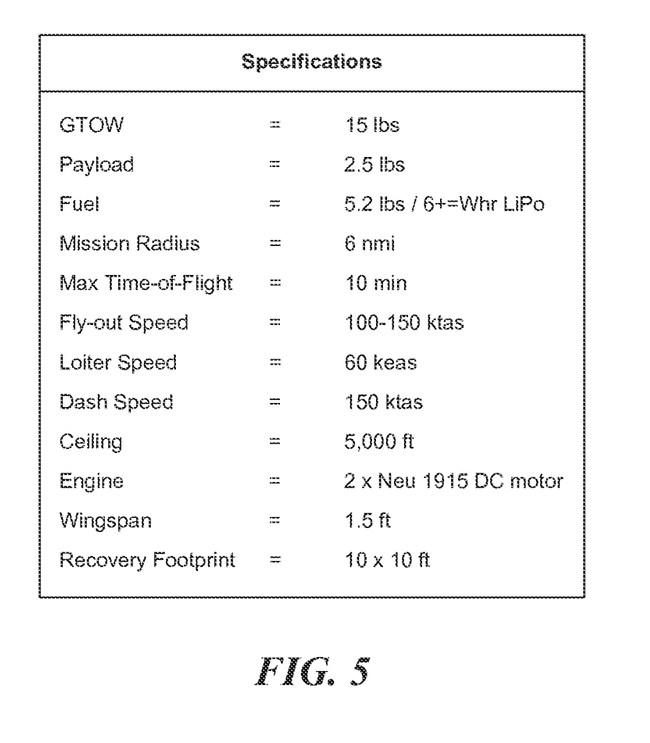
FIG. 5 is a table illustrating expected specifications for an interceptor UAV configured in accordance with a particular embodiment of the present technology.

FIG. 5 is a table illustrating representative specifications for an interceptor UAV 110 configured in accordance with a particular embodiment of the present technology. FIG. 5 includes representative values for gross take-off weight (GTOW), payload, fuel (e.g., battery size and type), mission radius, endurance, speeds, ceiling, engine specification, wingspan, and recovery footprint (e.g., the size of an airbag used to recover the interceptor UAV 110). It is expected that an interceptor UAV 110 with the characteristics identified in FIG. 5 can successfully intercept and disable a wide range of incoming target UAVs 199, e.g., ranging in size from micro-UAVs and quad-copters up to Tier II tactical UAS vehicles. Such UAVs are expected to be successfully intercepted and disabled at altitudes ranging from 0-5000 feet AGL.

Figure 6:
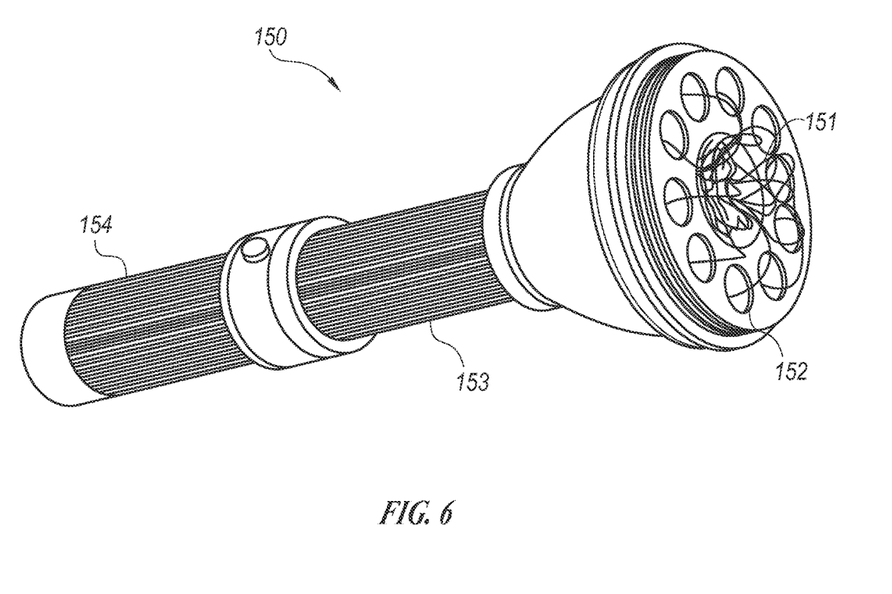
FIG. 6 illustrates a representative disabling system configured in accordance with an embodiment of the present technology.

FIG. 6 illustrates a representative disabling system 150 configured in accordance with a particular embodiment of the disclosed technology. The system 150 can include a net gun 153, such as are commercially available for capturing wild animals. The net gun 153 can include a propellant 154 (e.g., a conventional $CO_2$ cartridge) which directs a net 151 in a laterally outward direction. The weights 152 spread the net 151 out as it deploys. The disabling system 150 can have multiple modes, e.g., an inactive mode, an armed mode and a deployed mode. In other embodiments, the disabling system 150 can include other elements. For example, the disabling system 150 can include projectile, explosive, and/or energy-based components (e.g., lasers and/or high-powered RF generators).

Figure 7:
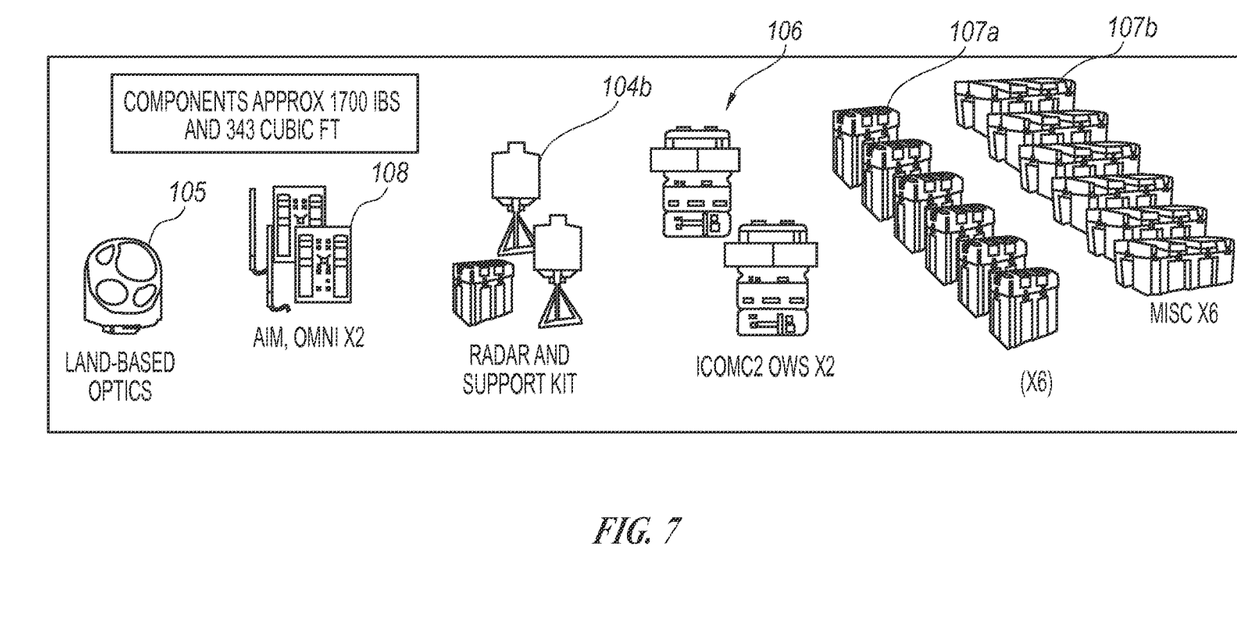
FIG. 7 illustrates representative subsystems and transport features in accordance with particular embodiments of the present technology.

FIG. 7 is a partially schematic illustration of particular components of the overall system 100 and containers in which the components can be transported. For example, FIG. 7 illustrates a representative land-based optics system 105, a pair of antenna interface terminals 108 (for communication with the interceptor UAVs), and a ground-based radar and support system 104b. FIG. 7 also illustrates a representative command, control and data system 106, for example, an ICOMC2 system available from Insitu Inc. The system 106 can include two operator work stations, one for each of the interceptor UAVs 110 that can be deployed against a single target UAV 199. The foregoing elements can be transported in first containers 107a (e.g., six such containers) and second containers 107b can be used to carry miscellaneous components and other components not specifically shown in FIG. 7, including the vehicle itself, launch systems, recovery systems, and storage and health systems. These containers are specifically designed to be readily transported and handled manually or with automated equipment.

One feature of several of the embodiments described above is that the system 100 can include the capability for the interceptor UAV 110 to be recovered and reused, for example, if it has not successfully engaged with an incoming target. This feature can be advantageous because it reduces the cost of operating the system 100 in the event that a particular interceptor UAV 110 is unable to successfully engage with the target. This feature can also reduce or eliminate the likelihood for collateral damage.

Another feature of at least some of the foregoing embodiments is that the overall system 100 can deploy multiple interceptor UAVs 110 against a single incoming target UAV 199. This ability to provide redundant and/or multiple counter-measures against the target UAV 199, thus improving the likelihood for disabling the target UAV 199. For example, this arrangement can provide a "second chance" in the event that an initial interceptor UAV is unsuccessful in its attempt to disable the incoming target UAV 199. The overall result of the foregoing features is that the system 100 can be robust and low cost, compared with other conventional systems.

Still another feature of at least some of the embodiments described above is that the interceptor UAV 110 can include counter-rotating propellers located along the length of the UAV and/or integrated with the fin structure of the UAV. An advantage of this configuration is that it can provide a compact, efficient, propeller-based interceptor function, suitable for intercepting vehicles having relatively low airspeeds, without the complexity, expense, and/or handling complications presented by more complex rocket-based or gas turbine-based systems. In addition, this configuration is expected to be highly maneuverable, which can in turn increase the likelihood of a successful engagement. For example, the highly maneuverable configuration can allow the interceptor UAV 110 to account for evasive maneuvers performed by the target UAV 199, and/or can allow the interceptor UAV 110 to re-engage with the target UAV 199 if its initial engagement is unsuccessful.

From the foregoing, it will be appreciated that specific embodiments of the disclosed technology have been described herein for purposes of illustration, but that various modifications may be made without deviating from the technology. For example, while certain embodiments of the system were described above in the context of an interceptor UAV that deploys a net to engage and disable a target UAV, in other embodiments, the interceptor UAV can include other disabling systems. Such disabling systems can include the nose or other portion of the interceptor UAV 110 in an embodiment for which the interceptor UAV strikes the target UAV 199 in order to disable it. The first and second detectors described above in the context of radars 104a, 104b can have other configurations (e.g., IR or optical detectors) in other embodiments. Representative embodiments of the interceptor UAV 110 are shown as having a missile-type silhouette, with a generally round, cylindrical shape. In other embodiments, the interceptor UAV fuselage can have other shapes, and/or the flight vehicle 111 can have other suitable overall configurations. The flight vehicle 111 can have four fins arranged in a cruciform shape in some embodiments, and can have other arrangements and/or numbers of fins (e.g., three) in other embodiments. The flight vehicle 111 can launch vertically and land horizontally onto an airbag in some embodiments, and can launch and/or land in other manners in other embodiments. "Disabling" the target UAV can include causing the target UAV to deviate from its flight path sufficiently to reduce or eliminate the threat provided by the target UAV. This can include causing the target UAV to crash, arresting the target UAV, disrupting the target UAV and/or diverting the target UAV from its intended target or other target of value. The engagement system and/or the disabling system can be designed into the flight vehicle prior to manufacture, and/or can be configured to retrofit an existing flight vehicle.

Certain aspects of the technology described in the context of particular embodiments may be combined or eliminated in other embodiments. For example, while certain embodiments were described above in the context of a system that deploys multiple interceptor UAVs toward a single target UAV, other systems may be configured to deploy only a single interceptor UAV against any single incoming target UAV. Certain aspects of the overall system may be combined and/or segregated, depending upon the particular embodiment. For example, the launch control system can be integrated with one or more portions of the target acquisition system. The multiple radars (or other detectors) can be combined into a single detector. Furthermore, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

I claim:

1. An interceptor UAV system for disabling a target UAV, the system comprising:
    an interceptor UAV;
    a target acquisition system directable to an airspace to detect, track, or detect and track an incoming target UAV;
    a launch control system coupleable to the target acquisition system, the launch control system being programmed with instructions that, when executed, automatically direct the interceptor UAV to launch; and
    an engagement system carried by the interceptor UAV and in communication with the target acquisition system, the engagement system being programmed with instructions that, when executed,
        (a) direct the interceptor UAV to the target UAV; and
        (b) direct the interceptor UAV to land if the interceptor UAV does not successfully disable the target UAV.

2. The interceptor UAV system of claim 1 wherein the interceptor UAV is:
    a flight vehicle having:
        a generally cylindrical fuselage;
        a fin carried by the fuselage;
        a propulsion system that includes:
            a first propeller;
            a second propeller; and
            a power source coupled to the first and second propellers to rotate the first propeller in a first direction and rotate the second propeller in a second direction opposite the first direction;
        at least one control surface;
        a guidance system carried by the flight vehicle and coupled to the at least one control surface; and
        a disabling system carried by the flight vehicle and having a first, inactive mode and a second, active mode, wherein in the second mode, the disabling system is positioned to disable the target UAV.

3. The interceptor UAV system of claim 2 wherein the guidance system is configured to direct the vehicle along a controlled flight path to ground.

4. The interceptor UAV system of claim 2 wherein the guidance system is configured to direct the vehicle along a controlled flight path to ground upon receiving at least one of the following indications:
    (a) an indication to not engage with the target UAV; or
    (b) an indication that the interceptor UAV did not sufficiently disable the target UAV.

5. The interceptor UAV system of claim 2 wherein the fin is one of four fins arranged in a cruciform shape.

6. The interceptor UAV system of claim 2 wherein the fin is one of three fins.

7. The interceptor UAV system of claim 1 wherein the interceptor UAV includes:
    a flight vehicle having:
        a cylindrical fuselage elongated along a fuselage axis;
        four fins carried by the fuselage and arranged in a cruciform, each fin having a fin slot extending from the fuselage in an outboard direction transverse to the fuselage axis;
        a propulsion system that includes:
            a first propeller carried by the fuselage and rotatable about the fuselage axis in a first direction to sequentially pass in and out of successive fin slots;
            a second propeller carried by the fuselage and rotatable about the fuselage axis in a second direction opposite the first direction to sequentially pass in and out of the successive fin slots;
            a power source carried by the fuselage, the power source including a first electric motor coupled to the first propeller to rotate the first propeller in the first direction, and a second electric motor coupled to the second propeller to rotate the second propeller in the second direction; and
            a stored electrical energy source coupled to the first and second electric motors;
        at least one control surface carried by at least one of the fins;
        a guidance system coupled to the at least one control surface; and
        a deployable net carried by the flight vehicle and having a first, inactive mode and a second, active mode, wherein in the second mode, the deployable net is deployed from the flight vehicle to disable the target UAV.

8. The interceptor UAV system of claim 7 wherein the net is configured to detach from the interceptor UAV after deploying.

9. The interceptor UAV system of claim 7 wherein the net is configured to remain attached to the interceptor UAV after deploying.

10. The interceptor UAV system of claim 7 wherein the stored energy source includes a single source for both the first and second motors.

11. The interceptor UAV system of claim 7 wherein the stored energy source includes a first source for the first motor and a second source for the second motor.

12. The interceptor UAV system of claim 1, further comprising a disablement system carried by the interceptor UAV and being activatable to disable the target UAV.

13. The interceptor UAV system of claim 12 wherein the disablement system includes a deployable net.

14. The interceptor UAV system of claim 1 wherein the interceptor UAV includes:
    a generally cylindrical fuselage;
    a fin carried by the fuselage; and a propulsion system that includes:
  a first propeller;
  a second propeller; and
  a power source coupled to the first and second propellers to rotate the first propeller in a first direction and rotate the second propeller in a second direction opposite the first.

15. The interceptor UAV system of claim 1 wherein the target acquisition system includes a radar scanner, and wherein the interceptor UAV system further comprises:
  a ground-based targeting radar system coupleable to the scanner to
    (a) receive a location and track of the target UAV; and
    (b) determine an interception track for the interceptor UAV;
  a ground-based optics system coupleable to the ground-based targeting radar system to acquire a first image of the target UAV; and
  an interceptor optics system carried by the interceptor UAV and positionable to acquire a second image of the target UAV.

16. The interceptor UAV system of claim 15 wherein the engagement system is programmed to automatically direct an engagement flight path or a non-engagement flight path based on a comparison of the first and second images.

17. The interceptor UAV system of claim 1 wherein the interceptor UAV is a first interceptor UAV and wherein the launch control system includes instructions that, when executed, automatically direct a second interceptor UAV to launch before the first interceptor UAV disables the target UAV.

18. The interceptor UAV system of claim 1 wherein the engagement system is programmed with instructions that, when executed, direct the interceptor UAV to disable the target UAV.

19. The interceptor UAV system of claim 1 wherein the engagement system is programmed with instructions that, when executed, direct the interceptor UAV to disable the target UAV by striking the UAV.

20. The interceptor UAV system of claim 1 wherein the engagement system is programmed with instructions that, when executed, direct the interceptor UAV to land if the target UAV has already been disabled by another interceptor UAV.

21. The interceptor UAV system of claim 1 wherein the engagement system is programmed with instructions that, when executed, direct the interceptor UAV to land after the target UAV has been disabled by the interceptor UAV.

* * * * *